Nov. 7, 1933.  F. GEBERS  1,933,798
MANUFACTURE OF PROPELLERS
Filed Jan. 6, 1931   3 Sheets-Sheet 1
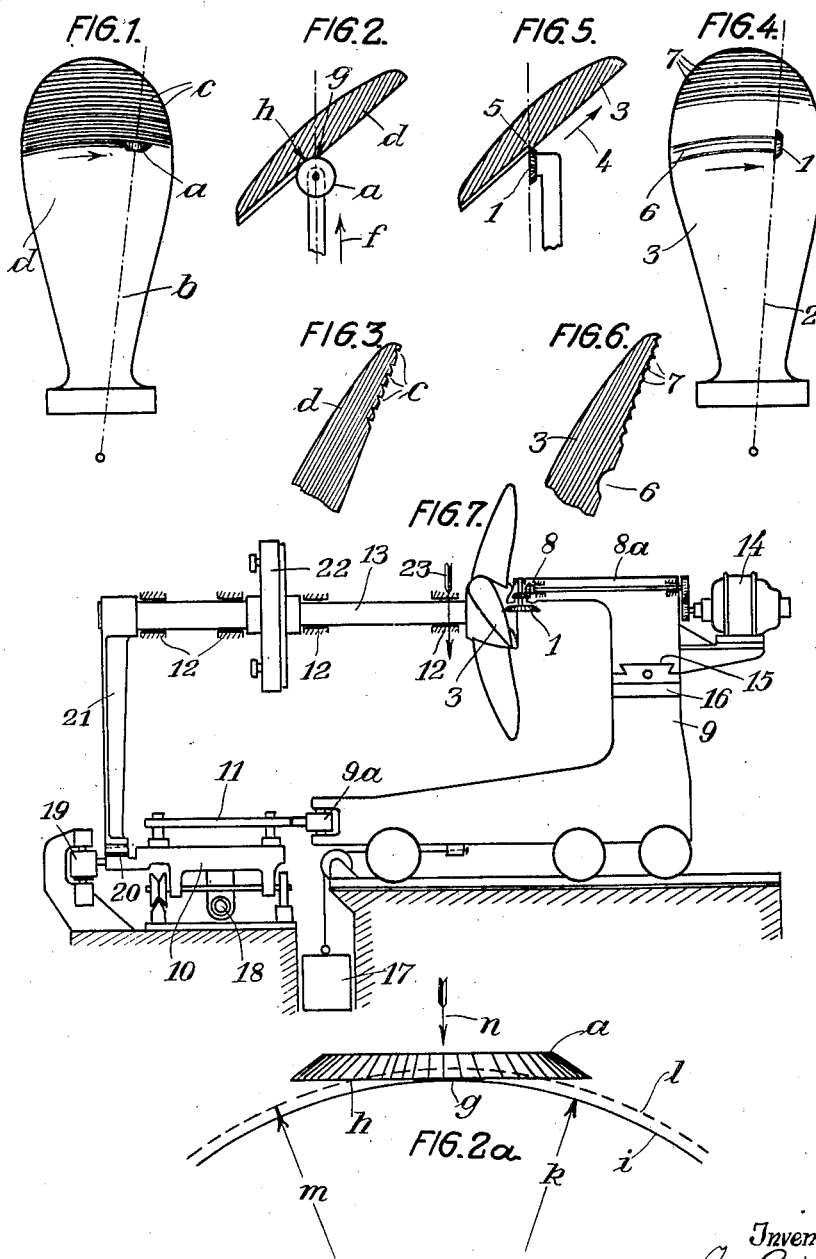

Nov. 7, 1933.  F. GEBERS  1,933,798
MANUFACTURE OF PROPELLERS
Filed Jan. 6, 1931   3 Sheets-Sheet 2

Inventor:
F. Gebers

Nov. 7, 1933.  F. GEBERS  1,933,798
MANUFACTURE OF PROPELLERS
Filed Jan. 6, 1931  3 Sheets-Sheet 3
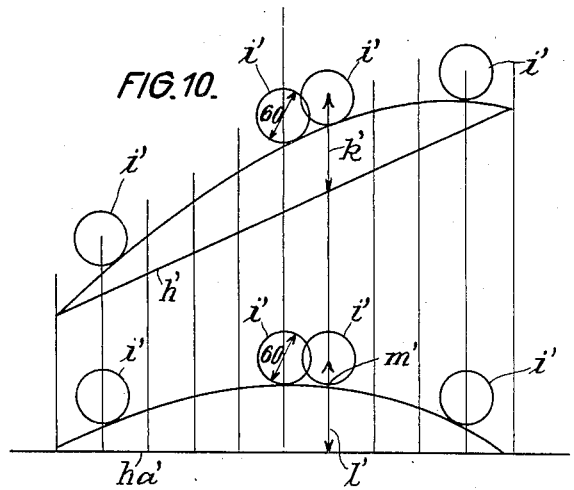
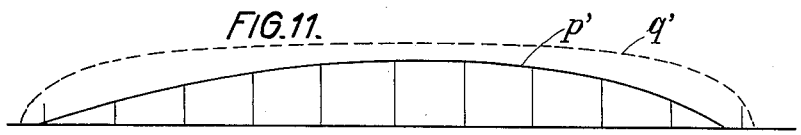
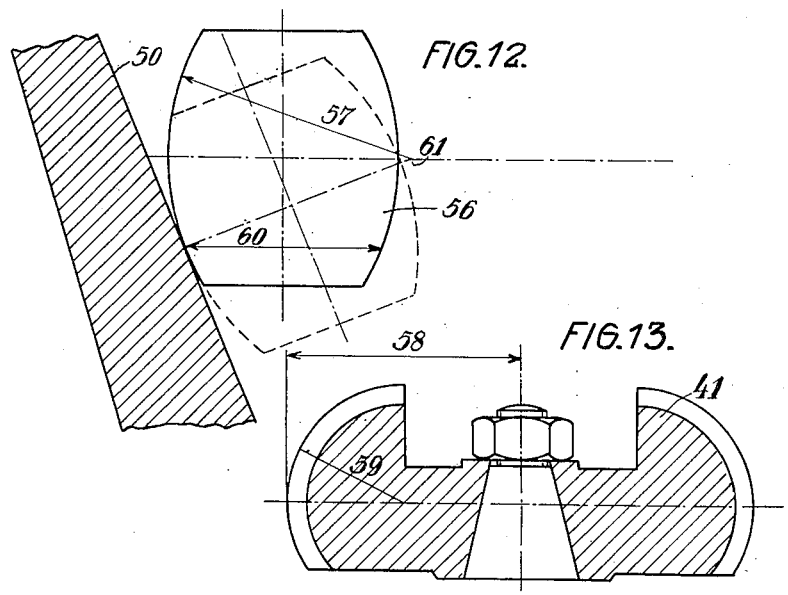
Inventor:
F. Gebers Patented Nov. 7, 1933

1,933,798

UNITED STATES PATENT OFFICE 1,933,798

MANUFACTURE OF PROPELLERS

Friedrich Gebers, Vienna, Austria

Application January 6, 1931, Serial No. 506,961, and in Germany January 21, 1930

4 Claims. (Cl. 90—13)

Propeller milling machines are known, in which a disc-shaped milling cutter is guided with its milling circle perpendicular to a generatrix of the propeller surface in the arc of a circle across the surface to be tooled Owing to the position of the milling cutter perpendicular to the generatrix the milling cutter does not bear against the surface to be tooled, which has a definite inclination varying with the distance of the milling cutter from the centre of the propeller, in the point corresponding to the forward feed of the milling cutter exactly according to the pitch, but in a point lying laterally with respect to it, so that actually the desired pitch is never milled in, if this error be not corrected by the setting of the pitch ruler being altered in accordance with the radius and the particular pitch. Incorrect tooling of the propeller surface is also brought about by the cutting plane of such a milling cutter being tangential to the circular arc on which it is guided. In consequence of this the milled groove must, as the pitch increases, run out on a greater radius than that along which it is guided, and conversely, with a smaller pitch, on a smaller radius, a fact which, when milling a variable pitch or when milling the reverse side of the propeller, can only be compensated by a corresponding displacement of the milling cutter in the direction of its axis. Owing to the inconvenience of this error correction it is found necessary when milling in this manner, to restrict the number of milled cylinder sections as far as possible. Furthermore, when adjusting the milling cutter in this manner, only narrow grooves having an acute-angled cross-section are usually cut into the propeller material and all the material left standing between these grooves, which represents a relatively considerable mass, has to be cut away by hand, which operation is inconvenient, takes much time and involves considerable cost.

These disadvantages are overcome by the apparatus according to the invention, by the milling cutter being guided in such a manner across the surface to be tooled that the milling circle lies in the plane of a generatrix and the cutter in travelling across the surface works out broad grooves lying close together and of the cross-section of a segment of a circle, so that only little subsequent work is required.

An apparatus according to the invention is shown diagrammatically and by way of example in the accompanying drawings, the apparatus hitherto employed and the method carried out with it being at the same time shortly explained, so that the invention will be more readily understood.

Fig. 1 represents a plan view of a propeller blade with the milling cutter arranged as hitherto. The milling cutter may also be disposed as in Fig. 2a.

Fig. 2 is a cross-section in the form of a circular arc to an enlarged scale through a propeller blade at the place where the cutter is operative.

Fig. 2a is a plan view of the propeller surface with a milling cutter shown to a particularly large scale, arranged in the manner as hitherto employed.

Fig. 3 is a longitudinal section along a generatrix through the tip of a propeller blade to an enlarged scale after being partly tooled with a milling cutter arranged in the manner hitherto employed.

Fig. 4 is a plan view of a propeller blade with the milling cutter positioned according to the invention.

Fig. 5 is a cross-section through a propeller blade, corresponding to Fig. 2 with a milling cutter according to the invention.

Figure 8:
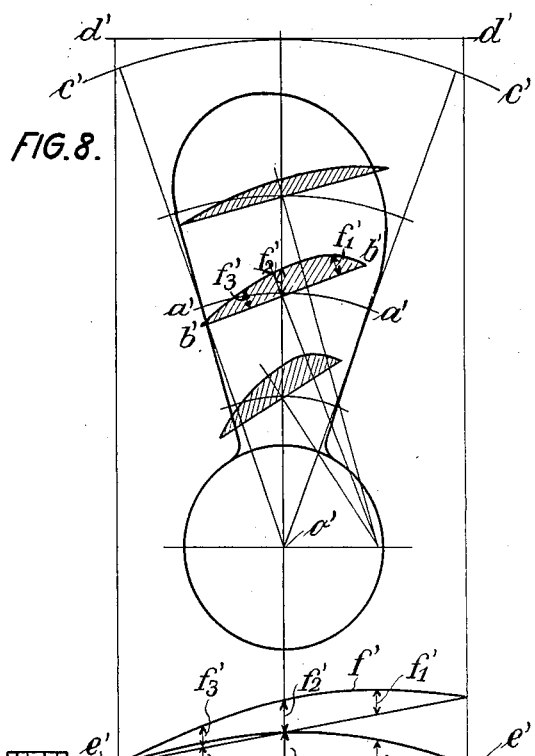

Fig. 6 is a longitudinal section through a blade tip, corresponding to Fig. 3, after being tooled with a milling cutter according to the invention, Fig. 7 is a side elevation of a milling machine according to the invention to a smaller scale, Fig. 8 shows the graphic method for enabling the back of the propeller blade to be operated on with the apparatus hereinafter described and without the employment of an auxiliary model.

Figure 9:
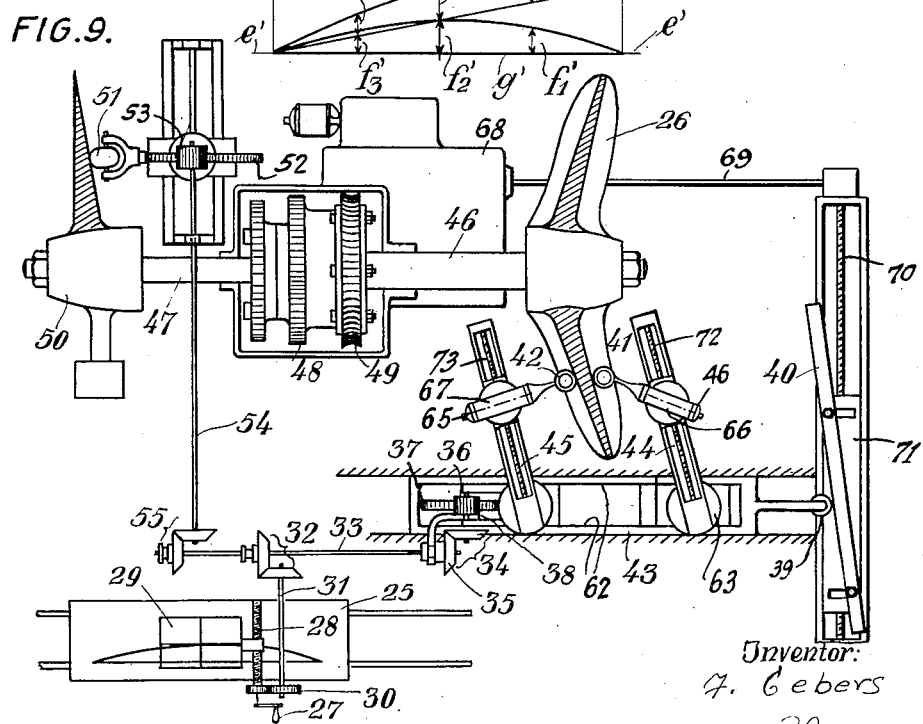

Fig. 9 shows the special arrangement required for operating on the propeller with which the back of a propeller is operated on both after a drawing and also after an auxiliary model which itself is made from a drawing, Fig. 10 shows the graphic method of obtaining the drawing required for tooling an auxiliary model, Fig. 11 shows an example of the final result of this graphic method, Fig. 12 shows the special construction of a guiding roller for transmitting the shape of the model to the milling device, and Fig. 13 shows the special shape of a milling cutter for the milling device, which makes accurate tooling possible.

As will be seen from Fig. 1 a disc-shaped milling cutter $a$ has hitherto been guided perpendicular to a generatrix $b$ in circular arcs transversely across the surface of a propeller blade $d$, so that separate grooves $c$ of acute-angled cross-section were cut into the surface of the propeller. In order to follow the pitch of the propeller, the forward feed of the milling cutter was in the direction of the arrow.

From Fig. 2 it will be clearly seen that the milling cutter rests against the propeller surface not in the point $g$ which lies in the line of the forward feed of the milling circle, but in a point $h$ situated laterally thereof. The forward feed of the milling cutter, which is determined by a pitch ruler, corresponds however to the point $g$ and not to the point $h$ on the propeller, so that without correction an incorrect pitch was milled in.

From Fig. 2a it will be seen that, owing to the milling cutter bearing laterally, in travelling across the surface of the propeller it never moves on a circular arc $i$ with a radius $k$, corresponding to the point $g$, but on a circular arc $l$ having a greater radius $m$. This can only be compensated, by the milling cutter being displaced during its travelling motion additionally in the direction of the arrow $n$, so as to bring the operative place of the latter into the circular arc $i$. When, however, a curve of continuously varying curvature has to be milled, as is for instance the case when milling the back surface of the propeller, the displacement of the cutter in the direction of the arrow $n$ must also continuously vary by another amount, which entails special difficulties.

From Fig. 3 it will be seen that even with grooves which lie close together being produced by the cutter, a large amount of material remains which has to be removed by hand milling tools and by filing.

Fig. 4 on the other hand shows how the milling cutter 1 according to the invention is set in the plane of a generatrix 2 and moves in the directon (arrow 4) of its milling axis across the surface of the propeller 3. The milling cutter may of course also be stationary and the propeller blade move in the opposite direction.

From Fig. 5 it will be seen that the cutter in this case bears against the propeller surface in the point 5 which lies in the plane of the forward feeding motion of the cutter circle.

From Figs. 4 and 6 it will be seen that in this method wide grooves 6 are cut out, the cross-section of which has the form of a segment of a circle. which may overlap one another to any extent and consequently leave only small ridges 7 standing. These ridges may then be easily removed by hand.

A particularly suitable arrangement is shown in Fig. 7 and consists substantially of a milling cutter head 8, a longitudinal slide or carriage 9, a rolling table 10 for a pitch ruler 11, and bearings 12 for a propeller shaft 13 on which the propeller to be milled is mounted.

The milling cutter 1 of the milling head 8 is driven in a suitable manner by a motor 14 and is mounted on the carriage 9 by means of a slide rest 15 so as to be dsplaceable thereon. The slide rest 15 is itself mounted on a rotary rest 16, such that the milling cutter 1 can be set in accordance with the pitch 7 of the generatrix. The carriage 9 is kept in contact with the pitch ruler 11 by a weight 17 so that the cutter 1 is fed forward to a corresponding extent during the motion of the rolling table 10 for instance by a screw spindle 18.

The roller 19 takes up the counter pressure of the weight 17. On the rolling table is a rack 20 with which a toothed sector 21 is in engagement. The latter is mounted on the propeller shaft 13, a coupling with a degree scale 22 being suitably interposed in the propeller shaft for bringing into position the particular propeller blade to be milled.

The arrangement operates as follows:

When a particular milling cut is to be made across the propeller surface the pitch ruler 11 is adjusted to the pitch described for this part of the propeller and the milling cutter 1 is brought in a corresponding manner by means of the slide rest 15 to a distance from the middle of the propeller axis which corresponds to the particular propeller circle. The milling cutter is put in operation at an edge, in the present case the left-hand edge, of the propeller blade and is fed forward by means of the screw spindle 18 of the rolling table 10. As a roller 9a of the carriage 9 always rests against the pitch ruler 11 the milling cutter is fed forward to a corresponding extent, the propeller blade 3 being at the same time rocked in the direction of the arrow 23 by the toothed sector 21 rolling on the rack 20 of the rolling table 10.

When a propeller has to be milled, the blades of which, as in the example shown, are inclined backwards, by turning the rest 16 an arm 8a of the milling head can be so adjusted that the said arm 8a is perpendcular to the inclined generatrix.

The case above described is one in which the milling cutter set in the direction of the generatrix is moved perpendicular to the said generatrix, that is to say on a circle, across the propeller surface. In many cases it may be suitable to cause the milling cutter set in this manner to travel in the direction of the generatrix, the advantage being that the milling cutter always works at the correct point of the propeller surface, with the disadvantage, however, that a considerable amount of material is not removed during the milling operation.

For propellers having reverse pitch, the milling head is turned about the milling plane in question through 180° and the guiding ruler is given the reverse inclination. For the back surface of the propeller or for propeller surfaces of variable pitch in general curved guiding rulers or adjustable guiding rails which can be given any desired curvature are used. Suitable for this purpose is for instance a flexible steel rail which by suitable clamping means can be given and set to any desired curvature.

In carrying out the invention in Figs. 8–13, a special, purely theoretical drawing is made use of, which has a certain relation to the blade cross-sections, and a model may also be employed, which has a relation to the thickness of a blade cross-section, for milling the back side of the propeller (suction side). This auxiliary model is then made by the graphic method, that is to say, by copying certain lines, and has the advantage that any errors can be compensated and that the milling of the actual propeller blade surfaces can be carried out simultaneously on both sides in a completely automatic manner.

Fig. 8 represents in the first place three cylindrical propeller sections which are at the same time inclined in the direction of their pitch lines. In addition the contour line of the blade projection is indicated. The cylinder section $a'$—$a'$, which, shown in the direction of its angle of pitch and laid over, is marked $b'$—$b'$, is projected from the centre line $o'$ of the propeller hub perpendicularly on to a cylinder surface $c'$—$c'$, which has the same radius as the radius of the rolling circle for the plotting table of the hereinafter described milling machine arrangement. The length of this cylinder section projected on to this cylinder surface is developed in the horizontal $d'$—$d'$, and the length of this horizontal is projected on to the plane $e'$—$e'$. If the cylinder section $b'$—$b'$ be extended in the same way, its representation $f'$ will be obtained above this plane. For the cylinder section lying nearer the centre this would mean a great height of the particular converted drawing. The limitations in the possibility of perpendicular sighting necessitate a limitation of this height to a definite amount. For this reason according to the invention the thicknesses $f_1'$, $f_2'$, $f_3'$ and so on of this section are plotted perpendicular to the plane $e'—e'$ directly above the plane $e'—e'$, and the figure $g'$ is thus obtained. This figure therefore contains only the thickness of the blade in the direction of a line parallel to the propeller axis at a particular place, projected on to a straight line which gives the base line to the blade inclination, and has been extended to the developed length $d'—d'$, as described above.

If the pitch line of the cylinder section be a curve, as is the case in propellers of variable pitch, it will only be a question of the thickness from this curve onwards. For arriving at this final result, it is not necessary in practice to carry out all the separate operations which are here described for the sake of clearness, but it is possible to plot the final result directly from the developed cylinder sections usually given in propeller drawings, taking the pitch into account. All the sections always have a portion of the same base line in common.

In Fig. 9 this drawing showing the thickness, "thickness diagram", is shown placed on the table 25. This table is moved corresponding to the radius $o'—c'$ of Fig. 8 by rolling off the blade rotation of the propeller 26 which is to be tooled. With the aid of a hand-operated crank 27, a sighting device 29 can be moved by means of a screw spindle 28 over this thickness section perpendicularly to the base line of this thickness section. The actual thickness of the blade according to the drawings, is transmitted to a carriage 38 and to a milling cutter 42 for the suction side by a spur wheel gearing 30, a shaft 31, a pair of bevel wheels 32, a shaft 33, a pair of bevel wheels 34, the wheel 35 of which is slidably mounted on its shaft and also by a toothed pinion 36 and a rack 37. The carriage 38 wherein the bevel wheels 34 and the toothed pinion 36 are mounted is slidably mounted in a guide 62 of a carriage 43. A second carriage 63 is adjustably mounted in the guide 62. The carriages 63 and 38 have rotatable transverse rests 44 and 45 on which the milling devices are rotatably mounted. The latter consist of the motors 64 and 65 which drive the milling cutters 41 and 42 over corresponding reduction gear provided in the casings or housings 66 and 67. The carriage 43 is moved by means of a roller 39 by a pitch ruler 40 which receives a movement (corresponding to the rotation of the propeller 26) from the main gear (provided in the casing or housing 68) over the shaft 69 and spindle 70. The pitch ruler is adjustably mounted on a sliding member 71 moved by the spindle 70.

The milling of a propeller blade is then effected in the following manner: During the rotation of the propeller 26, the pitch ruler 40 moves the carriage 43 and the support 63 with the milling cutter 41 for the pressure side of the blade. If the sighting device 29 were not operated, the toothed pinion 36 would remain at rest and since the rack 37 (secured to the carriage) engages in the toothed pinion, the carriage 38 together with the milling cutter 42 for the suction side of the blade would receive the same movement as the milling cutter 41. If the sighting device is now operated, the pitch movement of the carriage 38 will be supplemented by a second movement and the milling cutter 42 will thereby receive the proper distance from the pressure side of the blade which corresponds to the thickness of the blade. The transverse rests 44 and 45 are provided with spindles 72 and 73 with which the milling devices may be moved in the direction of the generatrix. A milling can thus be carried out on any desired cylinder section.

The thickness diagrams for other cylinder sections are made in an analogous manner and, by reducing the distance between the cylinder sections taken, the number of such sections transmitted to the propeller may be increased to any desired extent. In most cases it will suffice to draw a certain number of thickness sections, if the sighting device 29 be provided with means for adjusting it with respect to the nut of its screw spindle, which will allow of the interpolation of intermediate stages in the thickness and of the adjacent drawn thickness section being traced.

The transmission gear 30, to which motion is imparted by the hand-operated crank 27 already referred to for tracing the thickness sections, enables drawings to be used, in which the thickness dimension is to an enlarged scale, if it is thought that a greater degree of accuracy will be thus obtained.

The propeller 26 to be milled is mounted on a shaft 46, which is turned to and fro with a definite amplitude by means of a motor. In order to be able to tool the entire propeller surface automatically, a further shaft 47 is provided, which can be turned in the same direction as or the opposite direction to the shaft 46 by back gear not shown in the drawings. A toothed wheel 48 is mounted loosely on the shaft 46 and can be coupled with a worm wheel 49 which is fixed on the shaft 46. This worm wheel serves the purpose for turning the propeller by means of the shaft 46, after the completion of one of the blades, by such an amount that the next blade comes into position between the milling cutters. On the shaft 47 is mounted an auxiliary model 50. This auxiliary model can either be tooled with the propeller milling device already described, in which case it must be placed on the shaft 46, or it can be tooled directly in the position shown in the figure. The tooling of the model will be discussed below.

This auxiliary model is nothing more than a model of the thickness of the propeller parallel to the propeller axis at the particular position with a guiding roller 51 resting against it and corresponding to the places to be cut by the milling cutter 42. Against this auxiliary model 50 which is capable of rocking there rests the guiding roller 51 which acts by means of a rack 52, a pinion 53, a shaft 54 and transmission gearing 55 and 35 on the slide rest of the suction side milling cutter 42, so that with an automatic equal forward feed of the corresponding slide rests of the milling cutter and guiding roller during the rocking motion of the propeller, a completely automatic milling of the front and back of the propeller blade is effected simultaneously.

In order to make the automatic forward feeds in the radial direction for the roller on the auxiliary model and for the milling cutter in the direction of generating lines of any inclination equal to one another, the blade of the auxiliary model will be extended to the length of the generatrix of the propeller.

A particularly suitable form for the guiding roller 51 is that shown at 56 in Fig. 12. This is a barrel shape with a radius 57 which is equal to the radius 58 of the milling cutter used, which is illustrated in Fig. 13.

In cross-section the milling cutter will suitably follow the arc of a circle (radius 59, Fig. 13), the curvature being determined by the radius of the guiding roller at the point of contact with the generatrix of the propeller.

With blades of steep inclination this roller, as shown in Fig. 12, does not bear against the blade with its greatest diameter but with a smaller diameter 60. Corresponding to this smaller diameter the radius of the milling cutter 59 in Fig. 13 can be made equal to half the diameter of the guiding roller. In most cases this can be done only approximately.

The guiding roller may also be inclined about the point 61, as indicated in broken lines.

In Fig. 10, $h'$ again represents a cylinder section through a propeller blade with its inclination. Along the rear side of the blade there rolls a guiding roller circle $i'$ corresponding to the diameter at the particular point of contact (diameter 60, Fig. 12) as already described. The distance $k'$ of the centre of this circle is then plotted above the base line of the pitch or the front bounding line of the cylinder section as the distance $l'$ of the centre of the guiding roller circle for the thickness diagram. About this centre a circle is described corresponding to the radius at the point of contact in question of the guiding roller and the contact point $m'$ for the thickness diagram is thus obtained.

After the thickness diagram $ha'$ has been plotted in this way, it is transferred in an analogous manner, as in Fig. 8 the corresponding cylinder section $a'$—$a'$, to the cylinder surface $c'$—$c'$ and the thickness section as well is developed to the corresponding length as shown in Fig. 11 at $p$.

Fig. 11 contains, besides this section $p$, a further developed thickness section $q$ shown in broken lines. This is a section close to the root of the blade and is intended to show that in this case it is possible either only to mill in one direction, namely always from the middle of the section to the two ends, as otherwise the roller would no longer be capable of rolling on to the guiding surface owing to the latter being too steep, or that it is necessary at these places to extend the cylinder sections of the auxiliary model to a considerably greater circular arc and to make provision by a suitable transmission gear that the motion of the auxiliary model shall extend over a correspondingly greater circular arc than the rocking motion of the propeller.

For right-handed and left-handed propellers it is only necessary to make one such thickness model of the blade as it is possible by transmission gearing not shown in the drawings to make the direction of rotation of this auxiliary model opposite to that of the propeller.

It is also possible without any modification to copy any existing propeller directly with the arrangement described.

Further advantages of the method and of the apparatus according to the invention are as follows:

Without any modification, by using the same thickness model it is possible to mill a propeller having any pitch but the same projected blade surface.

By introducing suitable transmission gearing for the forward feed and the superposition of the thicknesses, similar propellers of different size can be milled and finally by varying the amplitude of the turning motion of the shafts for the propeller and thickness model, propellers having broader or narrower blades can be milled.

Instead of using a milling cutter as the operating tool a grinding disc or the like can of course be used.

What I claim is:

1. An apparatus for milling propeller surfaces comprising a rotary support for a propeller, a milling cutter for the pressure side of the propeller, having its milling circle set in the direction of the generatrix of the propeller surface, means for driving the milling cutter, a carriage capable of displacement in the direction of the propeller axis, a rolling table with a pitch ruler in operative connection with the displaceable carriage, a slidable and rotatable support on the carriage, for supporting the milling cutter and its driving means, connecting means between the rotatable propeller support and the rolling table for positively rotating the propeller relatively to the milling cutter of the pressure surface of the propeller.

2. An apparatus for milling propeller surfaces comprising a rotary support for a propeller, a milling cutter for the suction side of the propeller, having its milling circle set in the direction of the generatrix of the propeller surface, means for driving the milling cutter, a carriage capable of displacement in the direction of the propeller axis, a pitch ruler in connection with the displaceable carriage, a slidable and rotatable support on the said displaceable carriage for supporting the milling cutter for the suction side of the propeller and the means for driving the said milling cutter, a rolling table capable of being moved in correspondence with the rotary motion of the propeller, a drawing on the said rolling table for indicating the thickness of the propeller blade on the actual part of the cutter, a sighting arrangement positioned above the rolling table, a shafting between the said sighting arrangement and the support for the milling cutter for setting the suction side milling cutter at a correct distance from the pressure side of the propeller according to the thickness of the propeller blade at this part.

3. An apparatus for milling propeller surfaces comprising a rotary support for a propeller, a milling cutter for the suction side of the propeller, having its milling circle set in the direction of the generatrix of the propeller surface, means for driving the milling cutter, a carriage capable of displacement in the direction of the propeller axis, a pitch ruler in connection with the displaceable carriage, a slidable and rotatable support on the said displaceable carriage for supporting the milling cutter for the suction side of the propeller and the means for driving the said milling cutter, a shaft disposed preferably in the extension of the rotary support for the propeller, an auxiliary model on the said shaft, a guiding roller capable of being guided against the auxiliary model, a rack for supporting the guiding roller, a pinion in engagement with the said rack, a support for supporting the said rack with its pinion and a shafting between pinion and the rack of the guiding roller and displaceable carriage for the milling cutter for the suction side of the propeller.

4. An apparatus for milling propeller surfaces comprising a rotary support for a propeller, two milling cutters, one for the pressure side and the other for the suction side of the propeller, each set with its milling circle in the direction of the generatrix of the propeller surface, means for driving the milling cutters, a carriage capable of displacement in the direction of the propeller axis, a pitch ruler in connection with the displaceable carriage, two slidable and rotatable supports on the said displaceable carriage for supporting the milling cutters for the pressure side and suction side of the propeller and the means for driving the said milling cutters, a shaft disposed preferably in the extension of the rotary support for the propeller, an auxiliary model on the said shaft, a guiding roller capable of being guided against the auxiliary model, a rack for supporting the guiding roller, a pinion in engagement with the said rack, a support for supporting the said rack with its pinion and a shafting between the pinion and rack of the guiding roller and the support for the milling cutter for the suction side of the propeller.

FRIEDRICH GEBERS.